United States Patent
Reershemius (10) Patent No.: US 11,971,020 B2
(45) Date of Patent: Apr. 30, 2024

(54) ACTUATOR WITH A WIRE MADE OF A SHAPE-MEMORY ALLOY, AND DEVICE FOR RELEASING A BOLT COMPRISING SUCH AN ACTUATOR

(71) Applicant: Deutsches Zentrum für Luft—und Raumfahrt e.V., Bonn (DE)

(72) Inventor: Siebo Reershemius, Vechta (DE)

(73) Assignee: DEUTSCHES ZENTRUM FÜR LUFT—UND RAUMFAHRT E.V., Bonn (DE)

( * ) Notice: Subject to any disclaimer, the term of this patent is extended or adjusted under 35 U.S.C. 154(b) by 0 days.

(21) Appl. No.: 18/232,874

(22) Filed: Aug. 11, 2023

(65) Prior Publication Data
US 2023/0392586 A1 Dec. 7, 2023

Related U.S. Application Data

(63) Continuation of application No. PCT/EP2022/053208, filed on Feb. 10, 2022.

(30) Foreign Application Priority Data

Feb. 11, 2021 (DE) ..................... 10 2021 103 203.2

(51) Int. Cl.
F03G 7/06 (2006.01)

(52) U.S. Cl.
CPC ....... *F03G 7/06143* (2021.08); *F03G 7/0645* (2021.08)

(58) Field of Classification Search
CPC ........................... F03G 7/06143; F03G 7/0645
See application file for complete search history.

(56) References Cited

U.S. PATENT DOCUMENTS

| | | | |
|---|---|---|---|
| 4,197,709 A | 4/1980 | Hochstein | |
| 5,771,742 A | 6/1998 | Bokaie | |

(Continued)

FOREIGN PATENT DOCUMENTS

| | | |
|---|---|---|
| DE | 102009041907 A1 | 4/2011 |
| DE | 102019100694 A1 | 7/2020 |

(Continued)

OTHER PUBLICATIONS

Written Opinion in related PCT Application No. PCT/EP2022/053208, mailed Aug. 15, 2023.

*Primary Examiner* — Shafiq Mian
(74) *Attorney, Agent, or Firm* — Thomas | Horstemeyer, LLP (57) ABSTRACT

An actuator comprises a virtual actuator main axis, two endpieces, a compression spring, and a wire that is made of a shape-memory alloy and can be controlled to implement a change in length. The compression spring elastically supports the two endpieces against one another in the direction of the actuator main axis. The wire comprises at least six contiguous length portions. Each of the contiguous length portions extends and is tensioned between the two endpieces along the actuator main axis. The length portions are arranged with regard to one another in at least one of an axially symmetric way and an rotationally symmetric way with respect to the actuator main axis; and the length portions are oriented at equally sized angles with respect to a virtual reference plane to which the actuator main axis is a surface normal.

20 Claims, 7 Drawing Sheets

(56) References Cited

U.S. PATENT DOCUMENTS

| | | | |
|---|---|---|---|
| 5,865,418 | A | 2/1999 | Nakayama |
| 7,422,403 | B1 | 9/2008 | Johnson |
| 11,408,402 | B2 | 8/2022 | Muller |
| 2022/0056895 | A1* | 2/2022 | Müller .................... F03G 7/065 |

FOREIGN PATENT DOCUMENTS

| | | |
|---|---|---|
| EP | 0137502 A2 | 4/1985 |
| EP | 0841510 A1 | 5/1998 |
| EP | 2299141 A2 | 3/2011 |
| WO | 2008157466 A1 | 12/2008 |

\* cited by examiner

ACTUATOR WITH A WIRE MADE OF A SHAPE-MEMORY ALLOY, AND DEVICE FOR RELEASING A BOLT COMPRISING SUCH AN ACTUATOR

CROSS REFERENCE TO RELATED APPLICATIONS

This application is a continuation of International Application PCT/EP2022/053208 with an international filing date of Feb. 10, 2022 and claiming priority to German Patent Application No. DE 10 2021 103 203.2 entitled "Aktor mit einem Draht aus einer Formgedächtnislegierung and Vorrichtung zur Freigabe eines Bolzens mit einem solche Aktor", filed on Feb. 11, 2021.

FIELD OF THE INVENTION

The present invention generally relates to an actuator comprising two endpieces elastically supported against one another in a direction of an actuator main axis, and a wire made of a shape-memory alloy which is tensioned between the endpieces along the actuator main axis and which can be controlled to implement a change in length.

The invention also relates to an apparatus for clamping and releasing a bolt comprising such an actuator. Such an apparatus may, for example, be provided at an aircraft for, by means of releasing the bolt, separating a device fixed to the spacecraft via the bolt to set the device adrift or to release the device to unfold. Particularly, a solar panel or any other large surface structure may be unfolded at the spacecraft by releasing an elastically preloaded component.

BACKGROUND OF THE INVENTION

A braking or clamping apparatus comprising a housing at least partially surrounding a cylindrical guide rod is known from German patent DE 10 2009 041 907 B4. European patent EP 2 299 141 B1 belonging to the same patent family. The housing encloses four frictional restraining mechanisms which each have a friction jaw adapted to be urged against the guide rail as a part of an elastic clamping sleeve and which are operatable via a shifting-wedge-type transmission. The shifting-wedge-type transmissions are drivable for loading and unloading the frictional restraining mechanisms by means of one actuating member and spring storage means per loading and unloading direction. A central body which holds parts of the shifting-wedge-type transmissions and which radially supports the clamping forces of the shifting-wedge-type transmissions and which at the same time holds parts of the spring storage means is longitudinally displaceable within the housing by means of an actuating member. On the other hand, the clamping sleeve is arranged in the housing without axial play. Heated or cooled shape-memory alloy members may be used as the actuating members. However, a practical embodiment of a shape-memory alloy member is not described. All actuating member may both be used in the loading and the unloading direction.

A release mechanism comprising an actuating member made of a shape-memory alloy is known from U.S. Pat. No. 5,771,742. When the actuating member is heated-up above its transition temperature, it applies a force to a latch which is supported via a compression spring. The force moves the latch to a releasing position. In the releasing position, the latch activates a higher energy stored in a drive spring. The energy drives a retaining member to move it out of engagement with a structure which is to be released. The retaining member is held in its locked position by a detent, and, for releasing the retaining member, the detent is moved from a captured position to a retracted position when the latch is moved by the actuating member. The actuating member made of the shape-memory alloy is a wire which, in exceeding the transition temperature, is shortened and thus moves the latch. In order to increase the stroke by which the actuating member moves the latch, the wire made of the shape-memory alloy is not tensioned along the shortest way between the latch and a housing of the release mechanism. Instead, the wire first runs from a fixation point at the housing over a greater length through a borehole in the housing before it extends out of the borehole to the latch. This extension of the wire to the latch runs at an angle of about 45° to the moving direction of the latch; and, then, the wire extends, across the moving direction, through the latch, before it gets, on a mirror-symmetric path through a second borehole in the housing, to a second fixation point at the housing. A part of the great length of the wire realized in this way, which, with a fixed percentual change in length of the wire of the shape-memory alloy results in a great absolute change in length, is compensated by the course of the wire between the housing and the latch at the angle of about 45° to the moving direction of the wedge. This angle gears down the change in length of the wire and the movement of the latch caused thereby. Once the retaining member has been released, some effort has to be spent for resetting the known release mechanism in order to be usable again. This may not be necessary in outer space. However, for testing the release mechanism under different loads, this is a drawback. Further, by means of the known release mechanism, the retaining member is pulled out of its engagement with the structure. The release mechanism is not suited for directly releasing a bolt such that the bolt may depart from the remainder of the release mechanism.

A releasable coupling device for releasing a component fixed via bolt having a head to move through a limited distance is known from U.S. Pat. No. 7,422,403. A shaft of the bolt comprises an area with a reduced diameter in which it is plastically deformable. The bolt is surrounded by a sleeve made of a shape-memory alloy which is axially lengthened when it is heated up beyond its transition temperature. In this way, the bolt is permanently lengthened. The change in length remains conserved when the shape-memory alloy is once again cooled down below its transition temperature. This known releasable coupling device is provided for one time use only and does not completely release the bolt when being operated.

The product Frangibolt of the company TiNi Aerospace, Inc., USA is based on a similar principle as that one that is described in U.S. Pat. No. 7,442,403. In the product Frangibolt, a bolt which is, with its one end, screwed into a structure to be released, which extends through a sleeve, and whose head is supported against the end of the sleeve facing away from the structure, in an area of its shaft prepared for this purpose, is ruptured by means of lengthening the sleeve by heating-up the sleeve over its transition temperature. The sleeve consists of a shape-memory alloy displaying a one-way memory effect, and, before used again, it has to be set back to its shortened shape. The bolt made of a titanium alloy is destructed in releasing the structure, i.e. it is provided for one-time use only. A further disadvantage is that, upon breaking the bolt, high elastic forces are instantaneously released which may result in an undesired movement of the released structure.

Further, it is known to set up an actuator in which a wire made of a shape-memory alloy that can be controlled to implement a change in length is tensioned between to endpieces. Practically, the wire may be controllable to implement a thermally caused shortening by applying an electrical voltage between its ends. The voltage causes a current through the wire, which, due to the electrical resistance of the wire, results in heating the wire above the transition temperature of its shape-memory alloy. This results in the shortening of the wire between its end that pulls the two endpieces together between which the wire is tensioned.

A flow control valve which has a barrel with an axial bore hole, a base member arranged at one axial end of the barrel, a valve body held in the other axial end of the barrel, which cooperates with the base member such that a valve opening is defined therebetween, a bias spring which presses the valve body in one direction for varying the valve opening, and a wire made of a shape-memory alloy, which connects the valve body with the barrel, is known from European patent application publication EP 0 841 510 A1 and U.S. Pat. No. 5,865,418 belonging to the same patent family. For varying the valve opening, the wire made of the shape-memory alloy, as a reaction to a thermal deformation, applies a force for moving the valve body against the bias spring. The wire is connected to an electric source for heating up the wire in order to cause the thermal deformation. The barrel has at least one anchoring member for the wire. Many engagement members for the engagement of the wire are formed at the valve body. Besides the anchoring member, the barrel is provided with a plurality of direction changing members around which the wire extends such that a length of the wire is longer than the distance between the anchoring members and the engagement members. The valve body is axially guided in the axial bore hole in the barrel or at the base member.

There still is a need of a potent compact actuator based on a wire made of a shape-memory alloy and a compact and functionally safe apparatus for clamping and releasing a bolt having this actuator, which, without big effort, are suitable for a repeated use and which release the bolt without releasing high forces.

SUMMARY OF THE INVENTION

The present invention relates to an actuator. The actuator comprises a virtual actuator main axis, two endpieces, a compression spring, and a wire that is made of a shape-memory alloy and can be controlled to implement a change in length. The compression spring elastically supports the two endpieces against one another in the direction of the actuator main axis. The wire comprises at least six contiguous length portions. Each of the contiguous length portions extends and is tensioned between the two endpieces along the actuator main axis. The length portions are arranged with regard to one another in at least one of an axially symmetric way and an rotationally symmetric way with respect to the actuator main axis; and the length portions are oriented at equally sized angles with respect to a virtual reference plane to which the actuator main axis is a surface normal.

The present invention further relates to apparatus for clamping and releasing a bolt. The apparatus comprises a clamping sleeve configured for receiving a part of the bolt, a main body enclosing a receptacle with a depth direction and a free cross sectional area decreasing in depth direction, a counter-bearing supported against the main body, and an actuator arranged between the clamping sleeve and the counter-bearing. The receptacle is configured for receiving a part of the clamping sleeve. The actuator is the actuator of the invention defined above, and is arranged between the clamping sleeve and the counter-bearing in such a way that its compression spring presses the clamping sleeve into the receptacle in the main body.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

In an actuator comprising two endpieces elastically supported against one another in the direction of an actuator main axis by a compression spring, and a wire made of a shape-memory alloy which is tensioned between the endpieces and which can be controlled to implement a change in length, the wire has at least six contiguous length portions which are side by side tensioned between the endpieces each along the actuator main axis, which are, with regard to the actuator main axis, arranged in at least one of an axially rotational and a rotationally symmetrical way with regard to each other, and which run at equally sized angels to a reference plane to which the actuator main axis is a surface normal. In other words, in the actuator, the wire runs forth and back between the endpieces. Thus, the force applied by the wire between the endpieces is at least six times as high as in a case in which the wire would only extend between the endpieces with one length portion.

At the same time, controlling the wire to implement a change in length is not more complicated than in case of a single run between the endpieces. Quite to the contrary, by means of the multiple run of the wire between the endpieces, with an even number of length portions, both ends of the wire may be present one of the endpieces and easily accessible there for subjecting the wire to an electric voltage between its ends. Further, the relative arrangement of the endpieces is stabilized with respect to relative tilts by the at least six length portions of the wire running between them. This particularly applies if not just 6 but at least 12, preferably at least 24, or even at least 36 contiguous length portions of the wire are, each along the main axis, tensioned between the endpieces.

Due to the change in length of the wire, the distance of the endpieces and, thus, the length of the actuator along the actuator main axis is varied, wherein the compression spring between the endpieces is further loaded or unloaded to some extent. In this way, a force applied to external components by the compression spring via the endpieces of the actuator may also be varied in that it is more or less supported between the endpieces by means of the wire.

As compared to a wire only tensioned once or twice between the endpieces, which would have to be thicker to apply the same forces between the endpieces as the wire of the actuator, which is several times tensioned between the endpieces, there are also electrical advantages. The current which has to flow through the wire for a direct resistive heating of the wire to increase its temperature within a certain period of time above the transition temperature of its shape-memory alloy linearly depends on the cross sectional area of the wire. Thus, with a thinner wire of the same shaped-memory alloy, this current is smaller and may thus be provided with more simple voltage sources. It is to be understood that these voltage sources have to apply a higher voltage to the wire to achieve the same heating power over the thinner but longer wire. Nevertheless, advantages remain due to the smaller current needed, and not only because of lower minimum requirements to the cross sectional area of connection lines.

It is to be understood that the length portions of the wire may not be electrically connected to one another by the endpieces of the actuator, if the wire shall be heated up by applying a voltage between its ends. This electrical connection which would mean a short circuit of the length portions, may be avoided by at least one of the following: making the endpieces of an electrically insulating material, by coating the endpieces, the wire or both of them with an electrically insulating material. In forming the endpieces of an electrically insulting material, it has to be cared for a sufficiently high stiffness of the endpieces so that they are not deformed, i.e. not essentially deformed, by the force exerted on them by the compression spring and particularly not by the force exerted on them by the wire upon its change in length. With regard to this aspect, it may be suitable to make the endpieces of a ceramic material or a metal alloy with a ceramic surface coating.

In the actuator, the endpieces may exclusively be supported against one another via the compression spring and the wire, i.e. also exclusively guided with regard to one another in the direction of the actuator main axis by the compression spring and the wire.

It is advantageous for the stability of the relative arrangement of the endpieces with respect to tilts that the length portions of the wire tensioned between the endpieces are arranged in at least one of an axially symmetrical and an rotationally symmetrical way with respect to the actuator main axis. The arrangement may be half as many times rotationally symmetric or even as many times rotationally symmetric as length portions are tensioned between the endpieces.

If the length portions of the wire are tensioned between points of the endpieces which are each arranged along a circular arc running around the actuator main axis, this also has a positive effect on the stability of the relative arrangement of the endpieces with regard to tilting.

Practically, the wire, between its individual length portions, may be guided around hooks which are arranged at the circumferences of both endpieces. Alternatively, the wire may be passed through holes in the endpieces, wherein the wire reverses its direction between neighboring holes in the endpieces. Additionally, the wire may be glued to the endpieces between its individual length portions i.e. there where it is guided around the hooks or rests on the endpieces between the holes. In this way, the wire, in its longitudinal direction, may be sufficiently fixed to the endpieces for tensioning the length portions between the endpieces such that there is no need for a particular clamping of the wire to the endpieces, except of, probably, at the ends of the wire. Any change in length of the length portions directly has an effect in form of a change in distance of the endpieces which corresponds to a stroke of the actuator.

The length portions of the wire tensioned between the endpieces run at equally sized angles with respect to a reference plane to which the actuator main axis is a surface normal. As a result, equal changes in length of all length portions, which in turn require equal lengths of all length portions, lead to everywhere equal approaches of the two endpieces due to the change in length of the length portions. Often, the angles of the length portions to the reference plane will be at least about 90° so that the length portions will be at least essentially parallel to the actuator main axis, wherein small deviations from 90° by not more than 10°, in particularly by not more than 5° are neglectable. Then, no or at least no relevant torsional moments are applied between the endpieces. However, if such torsional movements are compensated for by opposite inclinations of the length portions, a step down conversion of the change in length of the length portions into a smaller change in distance of the endpieces may be purposefully realized by equally sized angles of the length portions with respect to the reference plane that are smaller than 90°; these smaller changes in distance of the endpieces mean an step up conversion i.e. an increase of the force exerted between the endpieces due to the change in length of the wire.

It also contributes to the stability of the relative arrangement of the endpieces against tilting, if the length portions tensioned between the endpieces are arranged at radial distances to the actuator main axis which are in range from 0.5 times to three times or in a range from one times to two time a length of the length portions between the endpieces. Here, the length of the length portions between their supports at the endpieces, i.e., as a rule, the distance of the ends of the endpieces facing away from each other, is relevant. Then, the actuator in total has a large diameter as compared to its length between the ends of the endpieces facing away from each other. As it has already been indicated, the shape-memory alloy of the wire may particularly be composed and trained such that the wire—particularly by applying an electric voltage between its ends—is controllable for a thermally caused shortening. Due to the shortening of the wire, the endpieces are moved together against the force of the compression spring. Thus, the length of the actuator between its endpieces is shortened. The shortening of the wire may, for example, be used to reduce a force, which the compression spring exerts on external components via the endpieces of the actuator, in that the force is completely or essentially supported between the endpieces by the wire. Further, by means of shortening the wire, a high pulling force may be applied between the two endpieces and components fixed thereto.

With regard to its transition temperature, the shape-memory alloy of the wire is to be adapted to the conditions under which the actuator shall be used. The transition temperature of the of the shape-memory alloy should only be exceeded purposefully in controlling the wire to implement its change in length. On the other hand, the transition temperature should be closely above the highest temperature to which the shape-memory alloy is heated up even without controlling the wire to exceed the transition temperature in controlling the wire with as little effort as possible. If the actuator is, for example, not subjected to external heating above a certain temperature, a shape-memory alloy may be selected whose transition temperature is by a few Kelvin, i.e., for example, 3 to 10 Kelvin, above the certain temperature.

In the actuator, the compression spring may be dimensioned such that it lengthens the wire again once the wire cools down below the transition temperature of its shape-memory alloy again. Thus, the actuator returns to its starting shape and may also be used in two directions. This is not possible, if the wire, by means of applying an electric voltage between its ends, can be controlled to implement a thermally caused lengthening, because this lengthening, after cooling the wire, is not returned by the compression spring acting between the endpieces. In order to dimension the compression spring such that it lengthens the wire back to its starting length as soon as the wire cools down below the transition temperature of its shape-memory alloy again, it can be suitable to adapt the distance of the supporting surfaces of the compression spring at the endpieces and the length of the length portions of the wire to one another in that the endpieces are profiled in the direction of the actuator main axis in a suitable way.

The shape-memory alloy of the wire may also be a two-way shape-memory alloy such that the wire, even without influence of the compression spring, lengthens again as soon as it cools down below the transition temperature of its shaped-memory alloy again. With a two-way shape-memory alloy, the heating of the wire above the transition temperature may alternatively cause that the wire lengthens because, due to the properties of its two-way shape-memory alloy it may shorten in length again, even against the force of the compression spring, as soon as it cools down below the transition temperature of its shape-memory alloy again.

If the wire has a plurality of conductors or partial wires running in parallel and electrically connected in parallel, the operation reliability of the actuator with respect to ruptures of the wire or its partial wires is increased. The partial wires may be electrically insulated from one another but they need not to be electrically insulated from one another, and, preferably they are not electrically insulated from another. In their changes of direction in the area of the endpieces, the thinner partial wires are mechanically stressed to a lesser extent and thus rupture less quickly than a single wire of a same total cross section area. If nevertheless a rupture occurs, the rupture, at the highest probability, only occurs in one of the partial wires, and it may then be bridged by the others of the partial wires. Even if the partial wires are electrically insulated from one another, the current feed and the resulting heating of the remaining partial wires may also results in a heating and thus in the intended change in length of the ruptured partial wire. The partial wire may but need not to be twisted. The number of the partial wires may be between two and six or between three and five, i.e. particularly four.

The compression spring of the actuator may comprise at least one cup spring. For example, two cup springs may be stacked between the endpieces at opposite orientations. Each cup spring may be supported in a radial direction with respect to the actuator main axis at least one of the endpieces. This support may be implemented with or without play, wherein the latter embodiment increases the stiffness of the elastic support of the endpieces against one another in the direction of the main axis.

As already mentioned, it may be suitable to coordinate the distance of the supporting surfaces of the compression spring at the endpieces and the length of the length portions of the wire in that the endpieces are profiled in the direction of the actuator main axis in a suitable way. Thus, at least one of the endpieces may have a cap profile whose rim at which the wire is tensioned has a greater distance to the other endpiece in the direction of the actuator main axis than a central area at which the compression spring is supported. In this way, the distance of the supporting surfaces of the compression spring is purposefully reduced, or the length of the length sections and thus their absolute change in length in controlling the wire to implement its change in length, i.e. the stroke of the actuator, is purposefully increased.

In an embodiment of the actuator, aligned through openings extend through both endpieces parallel to the actuator main axis. These through openings, particularly if these are the only through openings of the actuator, may each extend on the actuator main axis. There may be further aligned through openings or through openings only leading through one of the endpieces, for example, for bearing and guiding members.

The apparatus for clamping and releasing a bolt comprises a clamping sleeve for receiving a part of the bolt, a main body which includes a receptacle having a free cross sectional area decreasing in depth direction for receiving a part of the clamping sleeve, and an actuator as described above. The actuator is arranged between the clamping sleeve and a counter-bearing supported against the main body in such a way that the compression spring presses the clamping sleeve into the receptacle of the main body. By controlling the wire of the actuator to implement a change in length, the pressure of the compression spring onto the clamping sleeve is varies. Particularly, the pressure of the compression spring onto the clamping sleeves is reduced by controlling the wire to implement a shortening such that a bolt which has been clamped in the clamping sleeve is released.

It is to be understood, that, in the apparatus and in any other application of the actuator, a plurality of such actuators may be connected in series, in parallel, or partially in series and partially in parallel in order to realize the necessary forces and the necessary stroke in controlling the wire to implement the change in length.

The force which is exerted by the compression spring onto the clamping sleeve in pressing into the receptacle may, in a generally known way, be step up converted in that the actuator engages with a cone envelope section shaped outer surface of the clamping sleeve via a cone envelope section shape inner surface of one of its endpieces. The two cone envelope section shaped surfaces may have equal full cone angles. The clamping sleeve of the apparatus may be an elastically deformable clamping sleeve, like, for example, a clamping sleeve made of spring steel and provided with slots in longitudinal direction. Further, it is preferred that the receptacle in the main body is delimited by a cone envelope section shaped inner surface of the main body having a first full cone angle, and that the part of the clamping sleeve received in the receptacle comprises a cone envelope section shaped outer surface having a second full cone angle, wherein the first full cone angle and the second full cone angle are equal such that the clamping sleeve, with its outer surface, rests against the inner surface of the main body over a large surface area, and is oriented by the inner surface of the main body or radially compressed upon pressing the clamping sleeve into the receptacle. Practically, the first full cone angle and the second full cone angle may be in range of 10° to 20°. In this way, high radial forces can be applied to the bolt to be clamped, on the one hand, and a movement of the clamping sleeve out of the receptacle which is necessary for releasing the bolt may already be initiated by a restoring force of the clamping sleeve.

However, it is particularly preferred, if one of the two endpieces of the actuator is fixed in the direction of the actuator main axis to such an extent to the counter-bearing and the other of the endpieces of the actuator is fixed in the direction of the actuator main axis to such an extent to the clamping sleeve that the clamping sleeve, in controlling the wire to implement a shortening, is pulled out of the receptacle in the main body to some extent. Thus, the bolt is securely released when the wire of the actuator is controlled to implement a shortening. This applies even with a high sticking friction between the sliding sleeve and the main body due to the high force which may be caused between the endpieces of the actuator by means of the wire.

Practically, the other of the endpieces of the actuator or an actuator member attached thereto may engage with a ring groove formed in an outer circumference of the clamping sleeve radially inwards with respect to the actuator main axis to fix the other of the endpieces of the actuator to the clamping sleeve in the direction of the actuator main axis. This engagement may have some play as long as the clamping sleeve upon controlling the actuator to implement a shortening is pulled out of the receptacle in the main body to a sufficient extent for releasing the bolt.

In an embodiment of the apparatus, the counter-bearing is a lid fixed to the main body. It may be a lid placed upon and glued to the main body, and the lid may have a lid opening which is aligned with a through opening running on the actuator main axis so that it allows for a passage of the bolt through the lid up into the clamping sleeve. However, generally, the bolt may also exit through a through opening at the other side of the main body facing away from the lid, the through opening being arranged at the bottom of the receptacle of the main body for the clamping sleeve.

Figure 1:
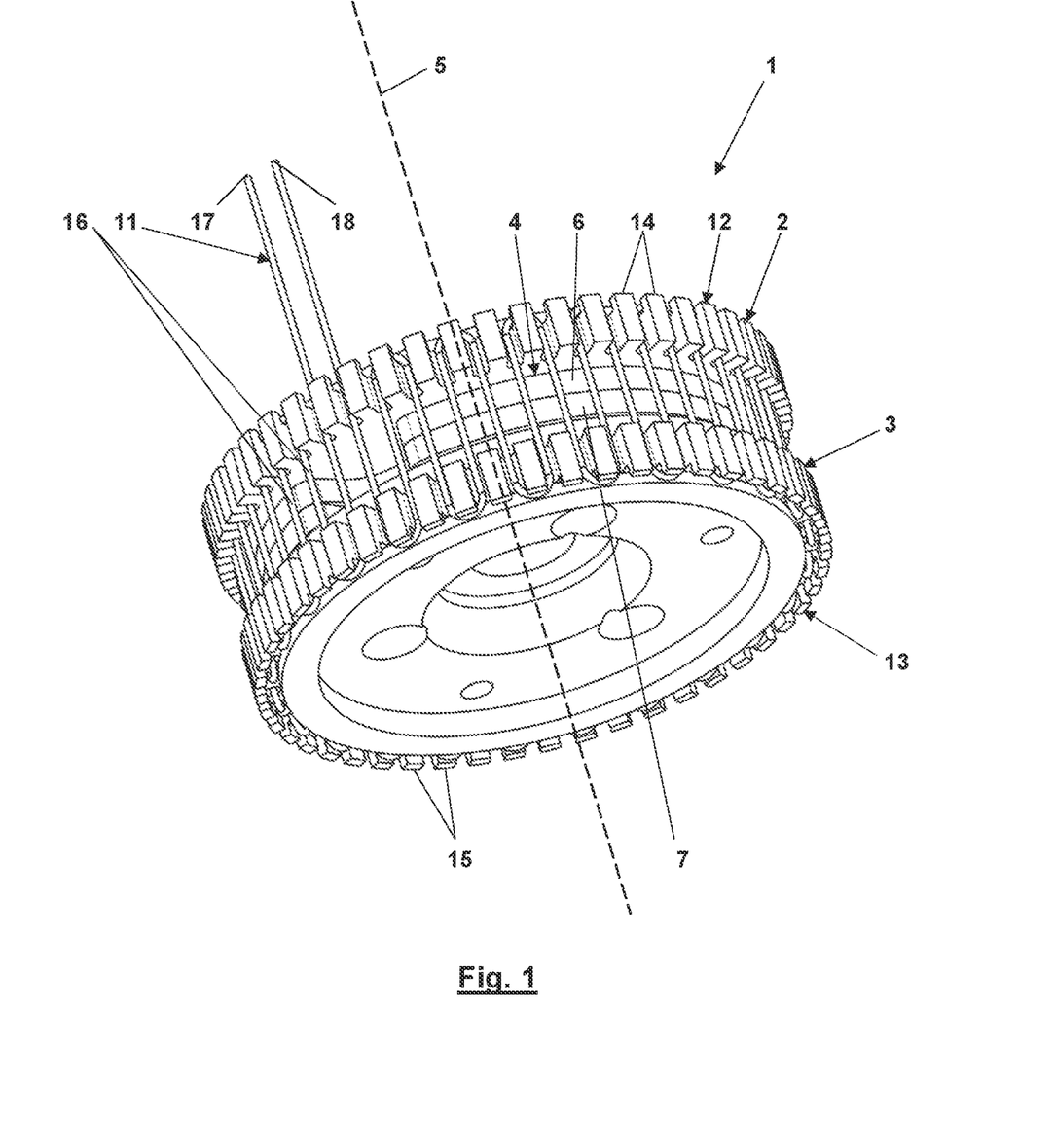
FIG. 1 is a perspective view of an actuator.
Figure 2:
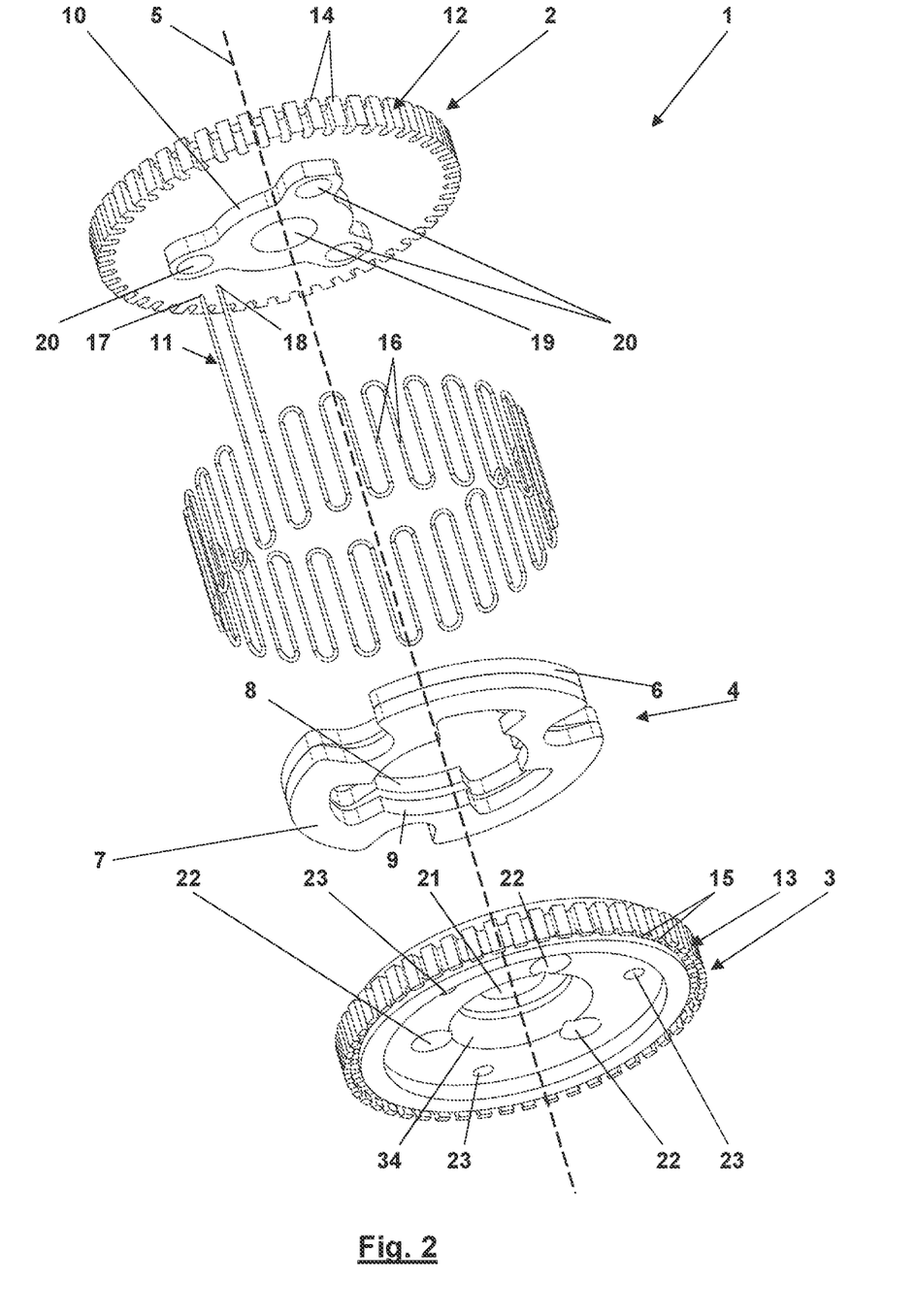
FIG. 2 is an exploded view of the actuator according to FIG. 1 from the same point of view as in FIG. 1.

Referring now in greater detail to the drawings, the actuator depicted in FIG. 1 and FIG. 2 comprises two endpieces 2 and 3 which are elastically supported against one another in direction of an actuator main axis 5 by means of a compression spring 4. Here, the compression spring 4 is assembled from two cup springs 6 and 7 stacked along the actuator main axis 5 with opposite orientations. The cup springs 6 and 7 have inner supporting surfaces 8 and 9 via which they are supported in radial direction with regard to the actuator main axis 5 at counter-surfaces 10 at the endpieces 2 and 3. In FIG. 2, only the counter-surface 10 of the endpiece 2 is visible of the counter-surfaces 10. Further, a wire 11 made of a shape-memory alloy is tensioned between the endpieces 2 and 3. Practically, hooks 14 and 15 are formed at the outer circumferences 12 and 13 of the endpieces 2 and 3, around which the wire 11 is alternatingly passed around. Length portions 16 of the wire 11 run between the hooks 14 and 15. In the present embodiment of the actuator, the length portions 16 run parallel to the actuator main axis 5. In the practical embodiment according to FIGS. 1 and 2 the number of the length portions 16 is 50. At least it is 4, preferably at least 6, more preferably at least 12, even more preferably at least 24, and it may even be at least 36. The length portions 16 are parts of the continuous wire 11 and, thus, interconnected. Upon applying an electrical voltage between the ends 17 and 18 of the wire 11, a current flows through the wire 11 which heats up the wire 11 due to the electrical resistance of the wire 11. If, during this heating up, the transition temperature of the shape-memory alloy of the wire 11 is exceeded, the wire 11 contracts. As a result, the endpieces 2 and 3 are moved towards each other against their elastic support via the compression spring 4. In other words, the length of the actuator 1 along the actuator main axis 5 is reduced. Even without the thermally caused shortening in length of the wire 11, the length portions 16 of the wire 11 may be under a pre-tension between the endpieces 2 and 3 which is provided by the compression spring 4. As particularly visible in FIG. 1, the diameter of the circumference 12 and 13 of the endpieces 2 and 3 is about three times as large as the height of the actuator 1 along the actuator main axis 5. Correspondingly, the distances of the length portions 16 to the actuator main axis 5 are about 1.5 times as large as the length of the length portions 16. Due to this and the high number of length portions 16, which are arranged in a 50 times rotationally symmetric arrangement around the actuator main axis 5, a high stabilization of the endpieces 2 and 3 with respect to mutual tilts relative to the actuator main axis 5 is achieved. The high number of the length portions 16 also provides for a high force by which the endpieces 2 and 3 are moved towards each other when the wire 11 is heated up beyond the transition temperature of its shape-memory alloy. For this heating up, a comparatively small current through the wire 11 having a small cross sectional area is sufficient. Through openings 19 and 20, and 21 and 22 are provided in the endpieces 2 and 3, respectively, for mechanically connecting the actuator, the central through opening 19 in the endpiece 2 being aligned with the central through opening 21 in the endpiece 3, and the further through openings 20 in the endpieces 2 each being aligned with one of the further through openings 22 in the endpiece 3. The cup springs 6 and 7 are shaped such that they do not block the passage between the through openings 19 and 20, on the one hand, and 21 and 22, on the other hand. Further, fixation holes 32 are provided in the endpiece 3.

Figure 3:
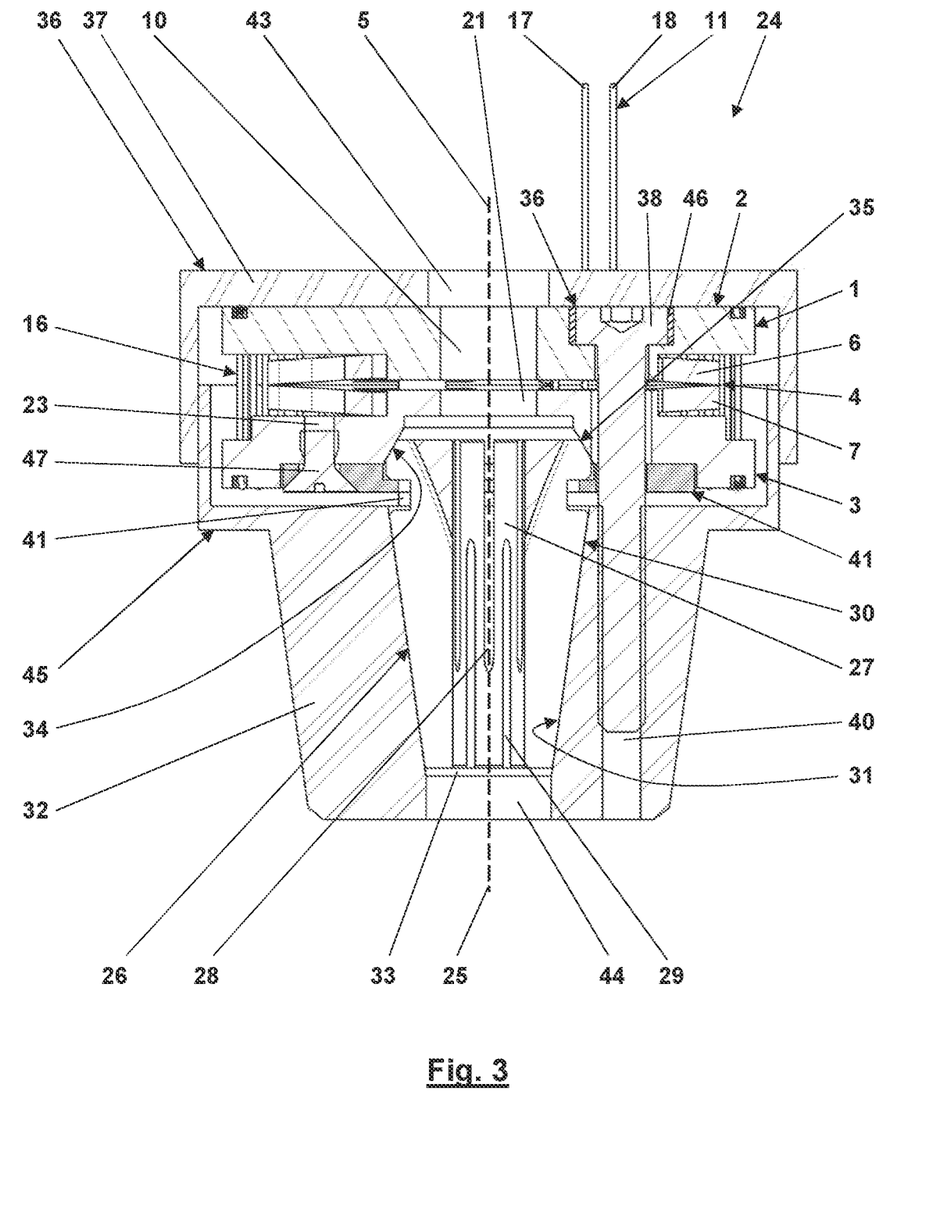
FIG. 3 is a longitudinal section through an apparatus comprising the actuator according to FIGS. 1 and 2.
Figure 4:
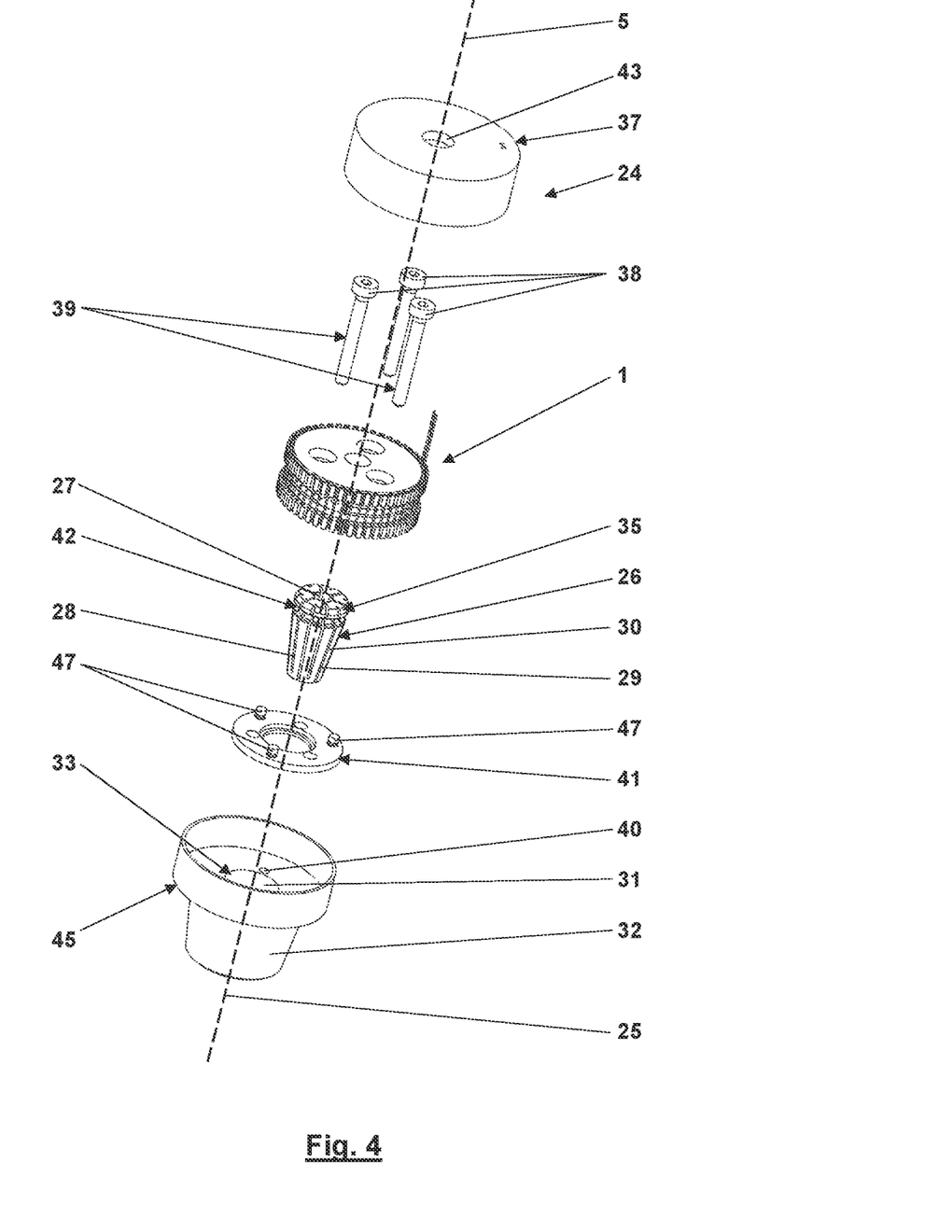
FIG. 4 is an exploded view of the apparatus to FIG. 3.

FIG. 3 and FIG. 4 show the actuator 1 as a component of an apparatus 24 for controlled clamping and releasing a bolt 4 which may be introduced along the apparatus main axis 25 coinciding with the actuator main axis 5 but which is not depicted. A clamping sleeve 26 is provided for clampingly receiving a part of the bolt. The clamping sleeve 26 has a cylinder envelope section shaped inner surface 27 for abutting against a cylinder envelope section shaped outer surface of the part of the bolt. The clamping sleeve 26 is made of spring steel and provided with slots 28 and 29 so that the clamping sleeve 26 is elastically compressible with reduction of the diameter of its inner surface 27 and elastically widens again with increase of the diameter of the inner surface 27. An outer surface 30 of the clamping sleeve is cone envelope section shaped and abuts against an also cone envelope section shaped inner surface 31 of a main body 32 of the apparatus 24. When the clamping sleeve is further pressed into a receptacle 33 in the main body 32 delimited by the inner surface 31, it is compressed radially with respect to the apparatus main axis 25, and the inner diameter inner surface 27 gets smaller, or the inner surface 27 abuts against the outer surface of the bolt to be clamped with a radial clamping force. The clamping sleeve 26 is pressed-in by the actuator 1, practically by the endpiece 3 of the actuator 1 which abuts against a cone envelope section shaped outer surface 35 of the clamping sleeve 26 via a cone envelope section shaped inner surface 37. Via these cone envelope section shaped surfaces 34 and 35, a force increase of the force is achieved by which the endpiece 3, via the compression spring 4 made of the cup spring 6 and 7, is elastically supported against the other endpiece 2. The other endpiece 2 is on its part supported against a counter-bearing 36 in form of a lid 37 placed on the main body 32 and glued to the main body 32, through which the ends 17 and 18 of the wire 11 pass through. Screws 39 are screwed into threaded holes 40 in the main body 32 through the through holes 20 and 22 in the endpieces. Screw heads 38 of the screws abutting against the endpiece 2 serve as further counter-bearings 36. Further, the actuator 31 can be precisely aligned with its actuator main axis 5 to the apparatus main axis 25 and in direction of the apparatus main axis 25 with respect to the main body 32 and the clamping sleeve 26 by rotating the screws 39 to screw them to a varying extent into the threaded holes 40. If the endpiece 3 and the screw head 38 are glued together with glue 46, not only the adjusted orientation of the actuator 1 is fixed but the screw heads 38 of the screws may also serve as counter-bearing 36 for the endpiece 3, if the actuator 1, upon controlling the wire 1 to implement a shortening of the length sections 16, contracts along the actuator main axis. The endpiece 2 may also be glued to the lid 37 so that the endpiece 2 is also supported against the lid 37 in pulling direction. The support in pulling direction is necessary to pull out the clamping sleeve 24 by an actuator member 41 out of the receptacle 33 to a sufficient extent that the bolt clamped in the clamping sleeve is definitively released upon controlling the wire 11 to implement a shortening of the length portions 16. The actuator member 41 engages with a ring groove 42 which is formed outside the receptacle 33 at the outer circumference of the clamping sleeve 26. The actuator member 41 is fixed to the endpiece 3 by, for example, fixation screws which engage with fixation holes 23 or gluing with glue not separately depicted here. The bolt to be clamped and then released in a defined way may be introduced through a central lid opening 43 in the lid 37 which is aligned with the through openings 19 and 21 in the endpieces 2 and 3 into the clamping sleeve 26, or through a through opening 44 at the base of the receptacle 33 from the opposite side of the main body 32. Without problem, the bolt may be introduced into the clamping sleeve 26 when the wire 11 is heated up above the transition temperature of its shape-memory alloy. After cooling down the wire 11 below the transition temperature of its shape-memory alloy, the compression spring 44 lengthens the length portions 16 of the wire 11. Then, the compression spring 4 acts upon the clamping sleeve 26 again and presses the clamping sleeve 26 into the receptacle 33. As a result, the clamping sleeve 26 is radially compressed and the bolt is clamped in the clamping sleeve 26. Upon heating up the wire 11 above the transition temperature of its shape-memory alloy again, the bolt is released again. This procedure may be repeated as often as desired.

Figure 5:
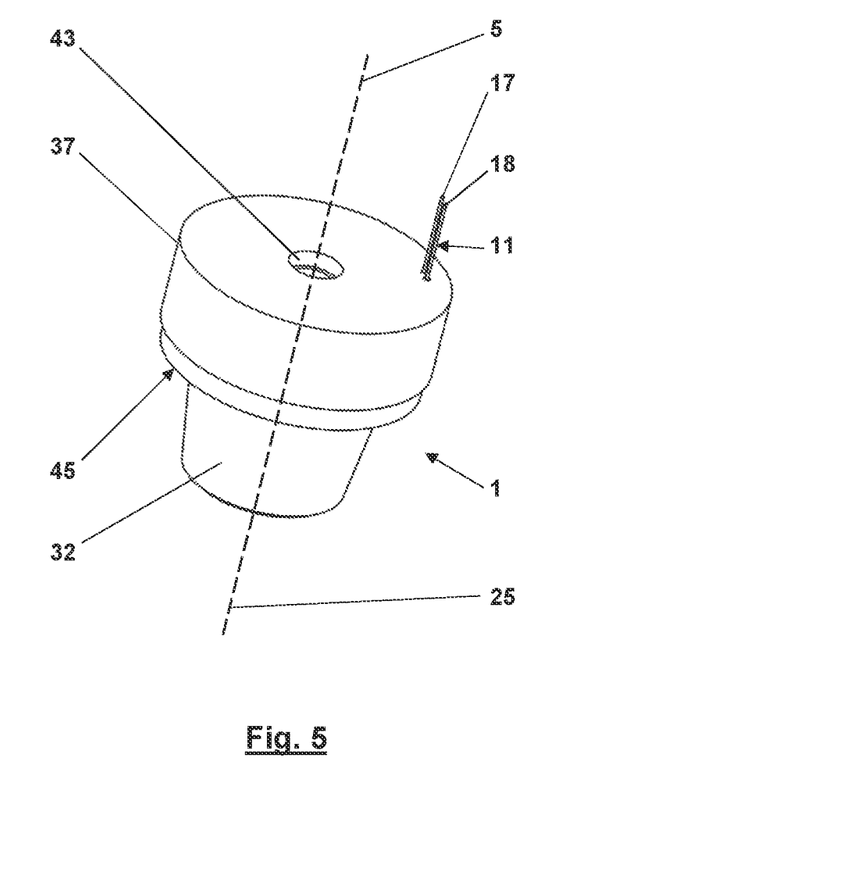
FIG. 5 is an exterior view of the apparatus according to FIGS. 3 and 4 from the same point of view as the exploded view according to FIG. 4.

FIG. 5 shows the compact dimensions of the apparatus 24 in an assembled state. Besides the step 45 provided here at the main body 32 of the apparatus 24, further supporting or fixation contours may be formed to fix the main body to a superordinate structure.

Figure 6:
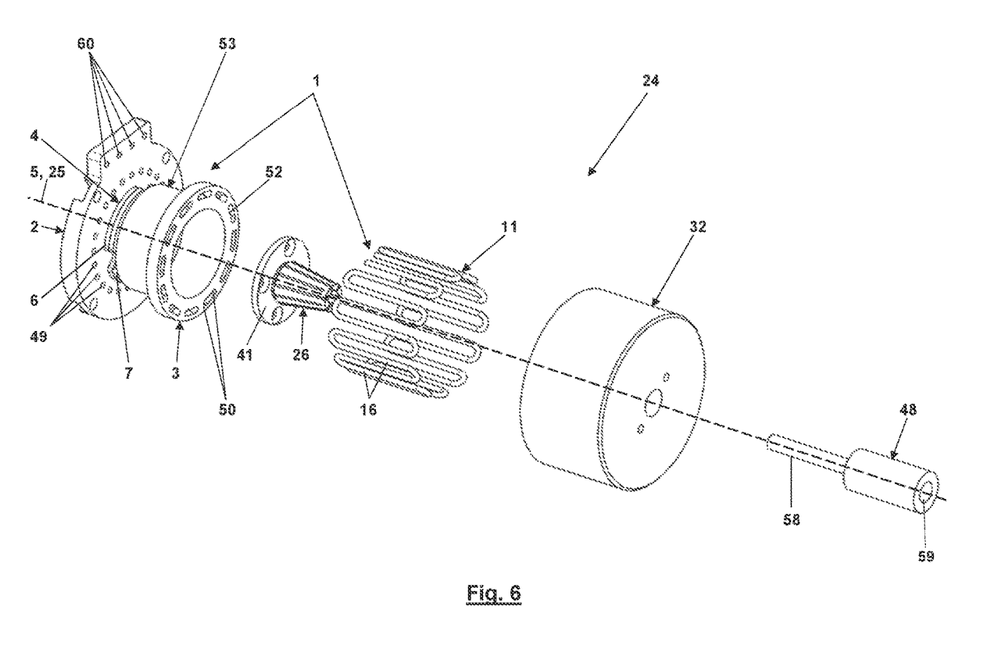
FIG. 6 is an exploded view of essential parts of a another embodiment of the apparatus comprising a another embodiment of the actuator.
Figure 7:
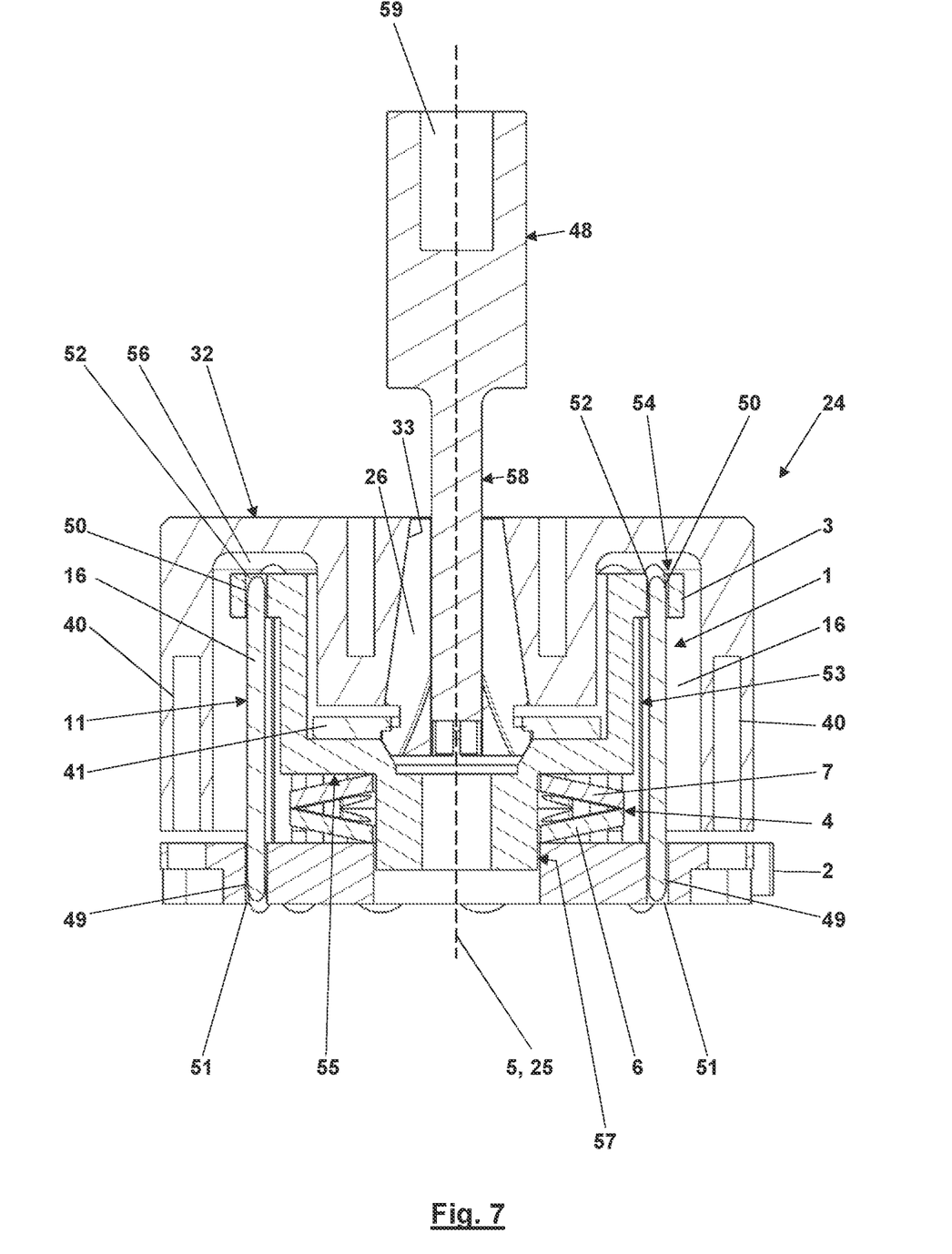
FIG. 7 is a longitudinal section through the apparatus according to FIG. 6.

The embodiment of the apparatus 24 depicted in FIG. 6 and FIG. 7 serves for clamping and releasing a bolt 48 in a controlled way, which is depicted here and which is introducible along the apparatus main axis 25 which here too coincides with the actuator main axis 5. The apparatus 24 according to FIGS. 6 and 7 includes an embodiment of the actuator 1 comprising the following particularities. The wire made of the shape-memory alloy runs through holes 49 and 50 in the endpieces 2 and 3 which are interconnected in pairs by short grooves 51 and 52 running, in circumferential direction, in those front faces of the endpieces 2 and 3 which face away from each other. Further holes 60 in the endpiece 2 serve for an end-side fixation of the wire 11 to the endpiece 2. It may not be directly taken from FIGS. 6 and 7 that the wire 11 consists of a plurality of parallel partial wires here, which are also electrically connected in parallel. The endpiece 3 has a cap profile 53 whose rim 54 to which the wire 11 is fixed has a larger distance to the other endpiece 2 in the direction of the actuator main axis 5 than its central area 55 at which the compression spring 4 is supported. In this way, the length portions 16 of the wire 11 between the endpieces 2 and 3 are comparatively long as compared to the axial extension of the compression spring 4 to realize a sufficient stroke of the actuator 1 with a limited percental change in length of the wire 11 made of the shape-memory alloy. The rim 54 of the cap profile 53 of the endpiece 3 dips into a ring groove running around the apparatus main axis 25 in the main body 52 resulting in a particularly compact design of the apparatus 24 in axial direction. The effective length of the length portions 16 between the endpieces 2 and 3 is slightly larger than the radial distance of the length portions 16 to the actuator main axis 5 here but clearly smaller than the diameter of circular arcs around the actuator main axis 5 on which the holes 49 and 50 in the endpieces 2 and 3 are arranged. In combination with the plurality of, here, 24 length portions 16, an inherent guiding of the endpieces 2 and 3 at one another results without an additional linear guiding in direction of the actuator main axis 5 being present. The short axial overlap 57 between the endpieces 2 and 3 is not sufficient for a linear guiding in direction of the actuator main axis 5. The bolt 48 is introduced with a cylindrical shaft 58 from that end of the main body 32 facing away from the endpiece 2 into the clamping sleeve 26 which sits in the conical receptacle 33 of the main body 32. At its free end, the bolt 48 has a fixation arrangement 59, like, for example, an internal thread, for fixation of an object to be released by releasing the bolt 48. Fixation screws 47 screwed into the threaded holes 40 are not depicted in FIGS. 6 and 7 but present as a matter of principle. The shape-memory alloy of the wire 11 may be a two-way shape-memory alloy so that the wire 11, upon falling below the transition temperature of the shape-memory alloy, may lengthen again even without influence of the compression spring 4. In this way, there is a high degree of freedom in tuning the spring constant of the compression spring 4. Further, the actuator 1 has a higher functionality which may be used in other applications of the actuator 1 than in the apparatus 24 depicted here.

Many variations and modifications may be made to the preferred embodiments of the invention without departing substantially from the spirit and principles of the invention. All such modifications and variations are intended to be included herein within the scope of the present invention, as defined by the following claims.

I claim:

1. An actuator comprising
a virtual actuator main axis,
two endpieces,
a compression spring, the compression spring elastically supporting the two endpieces against one another in the direction of the actuator main axis, and
a wire that is made of a shape-memory alloy and can be controlled to implement a change in length,
wherein the wire comprises at least six contiguous length portions, each of the contiguous length portions extending and being tensioned between the two endpieces along the actuator main axis, and
wherein the length portions are
arranged with regard to one another in at least an axially symmetric way and a rotationally symmetric way with respect to the actuator main axis, and oriented at equally sized angles with respect to a virtual reference plane to which the actuator main axis is a surface normal.

2. The actuator of claim 1, wherein the wire comprises at least 12 of the length portions.

3. The actuator of claim 1, wherein the wire comprises at least 24 of the length portions.

4. The actuator of claim 1, wherein the two endpieces are supported against one another exclusively by the compression spring and the length portions of the wire.

5. The actuator of claim 1, wherein the equally sized angles to the reference plane are in a range from 85° to 90°.

6. The actuator of claim 1, wherein the length portions are arranged at distances to the actuator main axis which are in a range from one times to three times an equal length of the length portions between the two endpieces.

7. The actuator of claim 1, wherein the length portions are arranged with regard to one another in a n times rotationally symmetric way with respect to the actuator main axis, wherein n is a half of a number of the length portions or n is a number of the length portions.

8. The actuator of claim 1, wherein the compression spring comprises at least one cup spring, wherein the at least one cup spring is supported against at least one of the two endpieces in a radial direction with respect to the actuator main axis.

9. The actuator of claim 1, wherein at least one of the two endpieces has a cap profile comprising a rim at which the length portions are tensioned and a central area against which the compression spring is supported, wherein the rim has a larger distance to the other one of the two endpieces in the direction of the actuator main axis than the central area.

10. The actuator of claim 1, wherein the length portions are tensioned between points of the two endpieces which, at each of the two endpieces, are arranged on a virtual circular arc around the actuator main axis.

11. The actuator of claim 10,
wherein the wire, between its length portions, is guided around hooks which are arranged at a circumference of the respective one of the two endpieces, or
wherein the wire is passed through holes in the respective one of the two endpieces, wherein the wire reverses its direction between neighboring holes in the respective one of the two endpieces.

12. The actuator of claim 1, wherein the wire can be controlled to implement a thermally caused shortening in length by applying a voltage between its ends, wherein the compression spring is dimensioned such that it returns the wire to its unshortened length as soon as the wire cools down again below a transition temperature of the shape-memory alloy.

13. The actuator of claim 1, wherein the shape-memory alloy is a two-way shape-memory alloy.

14. The actuator of claim 1, wherein the wire includes a plurality of conductors which run in parallel to one another and which are electrically connected in parallel.

15. The actuator of claim 1, wherein aligned through openings extend through both of the two endpieces in a direction parallel to the actuator main axis.

16. An apparatus for clamping and releasing a bolt, comprising
a clamping sleeve configured for receiving a part of the bolt,
a main body enclosing a receptacle with a depth direction and a free cross sectional area decreasing in depth direction, the receptacle being configured for receiving a part of the clamping sleeve,
a counter-bearing supported against the main body, and
an actuator arranged between the clamping sleeve and the counter-bearing,
wherein the actuator comprises
a virtual actuator main axis,
two endpieces,
a compression spring, the compression spring elastically supporting the two endpieces against one another in the direction of the actuator main axis, and
a wire that is made of a shape-memory alloy and can be controlled to implement a change in length,
wherein the wire comprises at least six contiguous length portions, each of the contiguous length portions extending and being tensioned between the two endpieces along the actuator main axis, and
wherein the length portions are
arranged with regard to one another in at least an axially symmetric way and a rotationally symmetric way with respect to the actuator main axis, and
oriented at equally sized angles with respect to a virtual reference plane to which the actuator main axis is a surface normal according to claim 1, and
wherein the actuator is arranged between the clamping sleeve and the counter-bearing in such a way that the compression spring presses the clamping sleeve into the receptacle in the main body.

17. The apparatus of claim 16,
wherein the receptacle is delimited by an inner surface of the main body that is shaped like a section of an envelope of a cone and has a first full cone angle,
wherein the part of the clamping sleeve which is received in the receptacle has an outer surface that is shaped like a section of an envelope of a cone and has a second full cone angle, and
wherein the first full cone angle and the second full cone angle are equal.

18. The apparatus of claim 16, wherein one of the two endpieces is fixed to the counter-bearing in the direction of the actuator main axis to such an extent and the other of the two endpieces is fixed to the clamping sleeve in the direction of the actuator main axis to such an extent that the clamping sleeve, when the wire is controlled to implement a shortening in length, is pulled out of the receptacle in the main body over some distance.

19. The apparatus of claim 18, wherein the other of the two endpieces or an actuator member fixed thereto engages with a ring notch formed in the outer circumference of the clamping sleeve in a direction radially inwards with respect to the actuator main axis.

20. The apparatus of claim 16,
wherein the counter-bearing comprises a lid fixed to the main body,
wherein aligned through openings extend through both of the two endpieces on the actuator main axis,
wherein the lid has a lid opening which is aligned with the through openings allowing for a passage of the bolt through the lid into the clamping sleeve.

* * * * *